United States Patent [19]
O'Brien et al.

[11] Patent Number: 5,993,079
[45] Date of Patent: Nov. 30, 1999

[54] IRIS DIAPHRAGM FOR HIGH SPEED PHOTOGRAPHIC PRINTERS

[75] Inventors: Michael J. O'Brien; Richard A. Colleluori, both of Rochester; Robert C. Bryant, Honeoye Falls, all of N.Y.

[73] Assignee: Eastman Kodak Company, Rochester, N.Y.

[21] Appl. No.: 09/003,447

[22] Filed: Jan. 6, 1998

[51] Int. Cl.[6] .............................. G03B 9/02; G03B 27/72; H02K 7/02
[52] U.S. Cl. ................. 396/508; 355/71; 310/74
[58] Field of Search ................. 322/4; 396/508; 355/71, 38; 310/74; 74/572

[56] References Cited

U.S. PATENT DOCUMENTS

| | | |
|---|---|---|
| 4,381,146 | 4/1983 | Yoshino et al. |
| 4,444,489 | 4/1984 | Bartel et al. |
| 4,851,870 | 7/1989 | Tanaka et al. ................ 354/234.1 |
| 4,862,207 | 8/1989 | Asakura et al. ................ 354/453 |
| 4,926,107 | 5/1990 | Pinson ................ 322/4 |
| 5,453,653 | 9/1995 | Zumeris. |
| 5,616,980 | 4/1997 | Zumeris. |
| 5,635,999 | 6/1997 | O'Brien et al. ................ 355/71 |
| 5,767,950 | 6/1998 | Hawver et al. ................ 355/71 |

*Primary Examiner*—Safet Metjahic
*Assistant Examiner*—Peter Kim
*Attorney, Agent, or Firm*—Peyton C. Watkins

[57] ABSTRACT

An iris diaphragm for selectively varying a diameter of an aperture, the iris diaphragm comprises at least two movable blades which are adaptable for forming the aperture; and a plurality of ceramic motors respectively attached to each one of the blades for causing said blades to vary the aperture formed therefrom.

15 Claims, 4 Drawing Sheets

IRIS DIAPHRAGM FOR HIGH SPEED PHOTOGRAPHIC PRINTERS

CROSS-REFERENCE TO RELATED APPLICATIONS

The present application is related to U.S. Pat. No. 5,635,999 issued Jun. 3, 1997 entitled "IRIS DIAPHRAGM FOR HIGH SPEED PHOTOGRAPHIC PRINTERS HAVING IMPROVED SPEED AND RELIABILITY" by Michael J. O'Brien and Richard A. Colleluori, and related to U.S. Pat. No. 5,576,792 issued Nov. 19, 1996 entitled "A METHOD FOR ASSEMBLING AN IRIS DIAPHRAGM" by Michael J. O'Brien, Richard A. Colleluori and William P. Luce.

FIELD OF INVENTION

The invention relates generally to the field of high speed photographic printers having an iris diaphragm that includes a plurality of blades for forming a variable aperture and, more particularly, to such high speed photographic printers having a plurality of ceramic motors each driving a blade of the iris diaphragm.

BACKGROUND OF THE INVENTION

A high speed photographic printer typically includes a light source under which a roll of developed film containing images on negatives is rapidly and continuously passed for reproducing the images on a roll of photosensitive paper, which is placed beneath the film. A lens assembly is placed between the paper and the roll of film for focusing the image and the amount of light which is directed onto the paper. The lens assembly includes two moveable groups of elements for controlling the magnification of the image and an iris diaphragm for controlling the amount of light.

The typical iris diaphragm includes a plurality of moveable blades for forming an adjustable aperture through which the light passes. The blades are typically controlled by a single stepper motor which, via movement of the blades, induces the variation of the aperture. This configuration is discussed in detail in U.S. Pat. No. 4,444,489. U.S. Pat. No. 4,381,146 discloses a standard iris diaphragm with an "inch worm" type ceramic motor.

Although the above described system and method for varying the aperture are satisfactory, they are not without drawbacks. It takes approximately two or three seconds to adjust the diameter of the aperture, and for high speed photographic printers, such a response time is insufficient to allow the aperture to change between images on the same roll of film because of the rapid speed at which the film is moving under the light source. High speed photographic printers typically require a quick response time, approximately 50 milli-seconds between images. Therefore, the entire roll of film is printed at one aperture setting, and if changes are needed for any of these printed images, the aperture is then adjusted and the copying process repeated. This consumes time, which obviously adds additional cost to the printing process.

In addition, the "inch worm" type motor requires multiple elements to operate and a relatively complex control scheme.

Consequently, a need exists for an iris diaphragm which includes a fast response time for permitting aperture variations between images, and which is economical to manufacture.

SUMMARY OF THE INVENTION

The present invention is directed to overcoming one or more of the problems set forth above. Briefly summarized, the present invention resides in an iris diaphragm for selectively varying a diameter of an aperture, the iris diaphragm comprising: (a) at least two movable blades which are adaptable for forming the aperture; and (b) a plurality of ceramic motor respectively attached to each one of said blades for causing said blades to vary the aperture formed therefrom.

It is an object of the present invention to provide an iris diaphragm which includes a fast response time for permitting aperture variations between images, and which is economical to manufacture.

It is an advantage of the present invention to provide an iris diaphragm which is compact for reducing space requirements.

It is a feature of the present invention to provide a plurality of ceramic motors respectively attached to each one of the blades for causing the blades to vary the aperture formed therefrom.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the following advantages. The iris diaphragm of the present invention has a response time of approximately 22 milli-seconds between the maximum and minimum aperture, and has a life expectancy of over 200 million actuations (from maximum to minimum aperture).

DETAILED DESCRIPTION OF THE INVENTION

Figure 1:
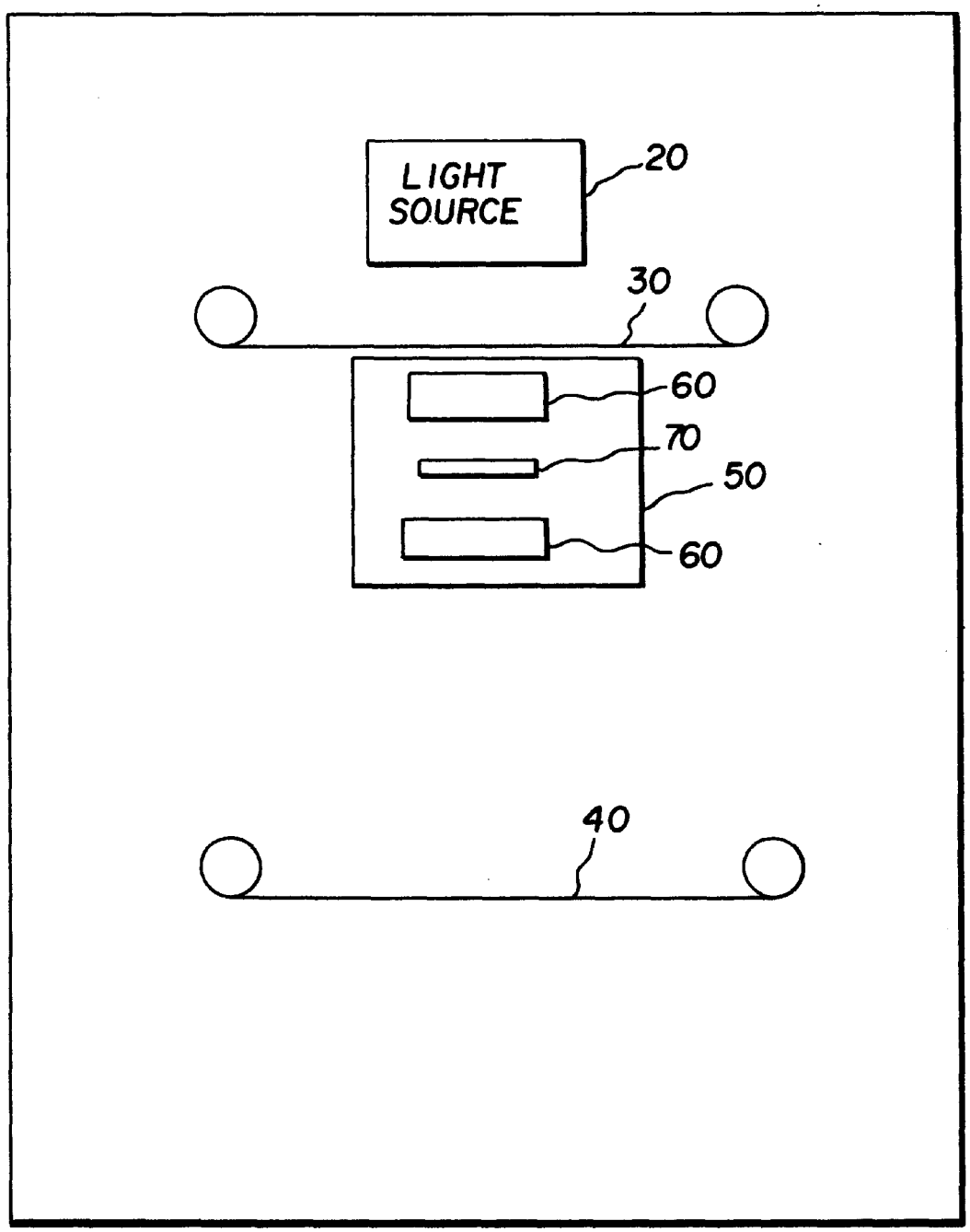
FIG. 1 is a schematic diagram of a typical high speed photographic printer.

In the following description, like reference characters designate like or corresponding parts throughout the several views of the drawings. Also in the following description, it is to be understood that such terms as "forward," "rearward," "leftwardly," "rightwardly," "upwardly," "downwardly," and the like are words of convenience and are not to be constructed as limiting terms.

Referring to FIG. 1, there is illustrated a high speed photographic printer 10 having a light source 20 under which a roll of developed film 30 containing images in negative form is rapidly and continuously passed. A roll of photosensitive paper 40 is placed under the film 30 for capturing the images from the negatives thereon. A lens assembly 50 is placed between the film 30 and paper 40 for controlling the intensity and amount of light passing onto the paper 40. The lens assembly 50 includes two zoom lens elements 60 for controlling the degree of magnification and an iris diaphragm 70 for controlling the amount of light.

Figure 2:
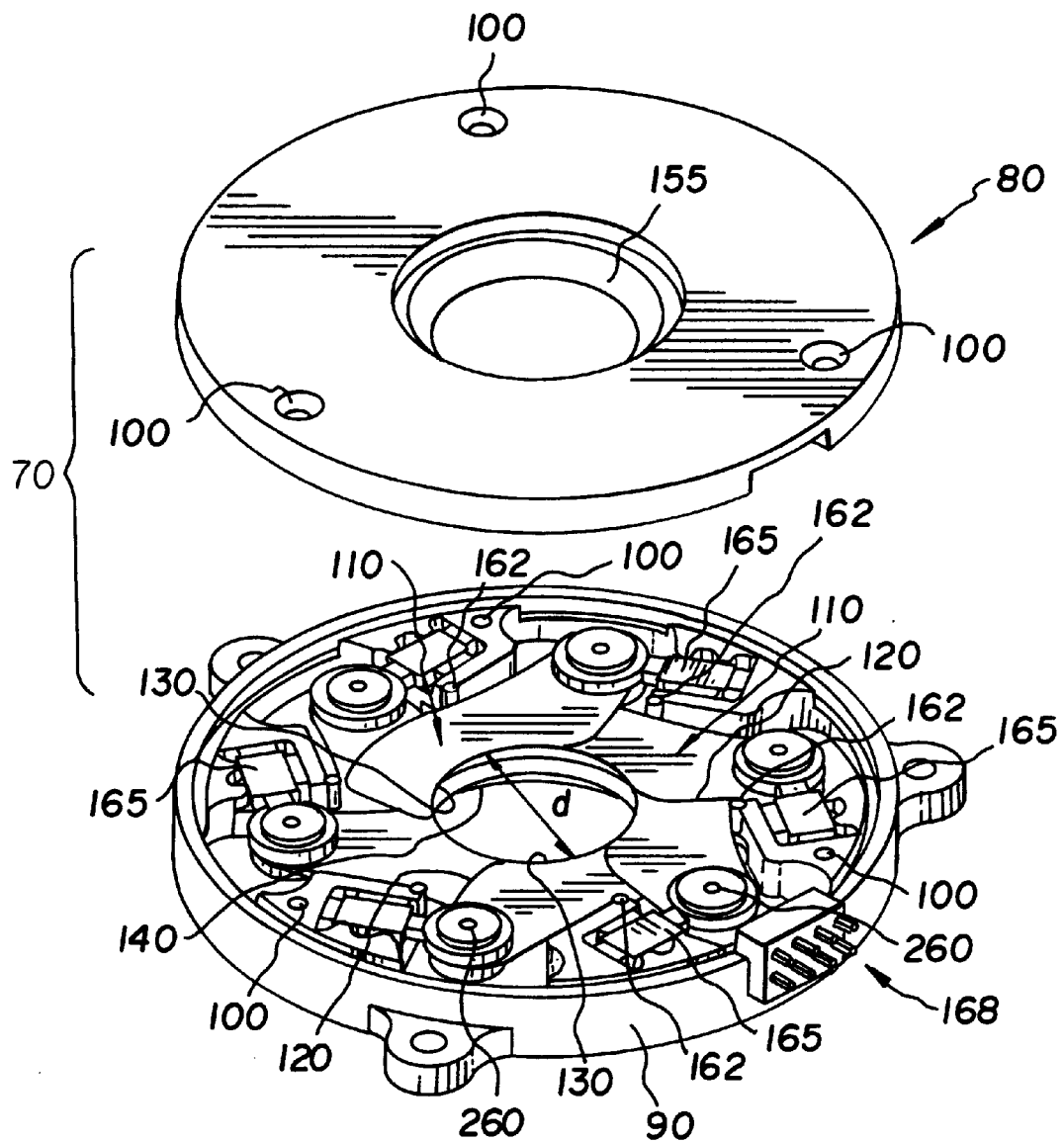
FIG. 2 is a perspective view of the iris diaphragm of the present invention.
Figure 3:
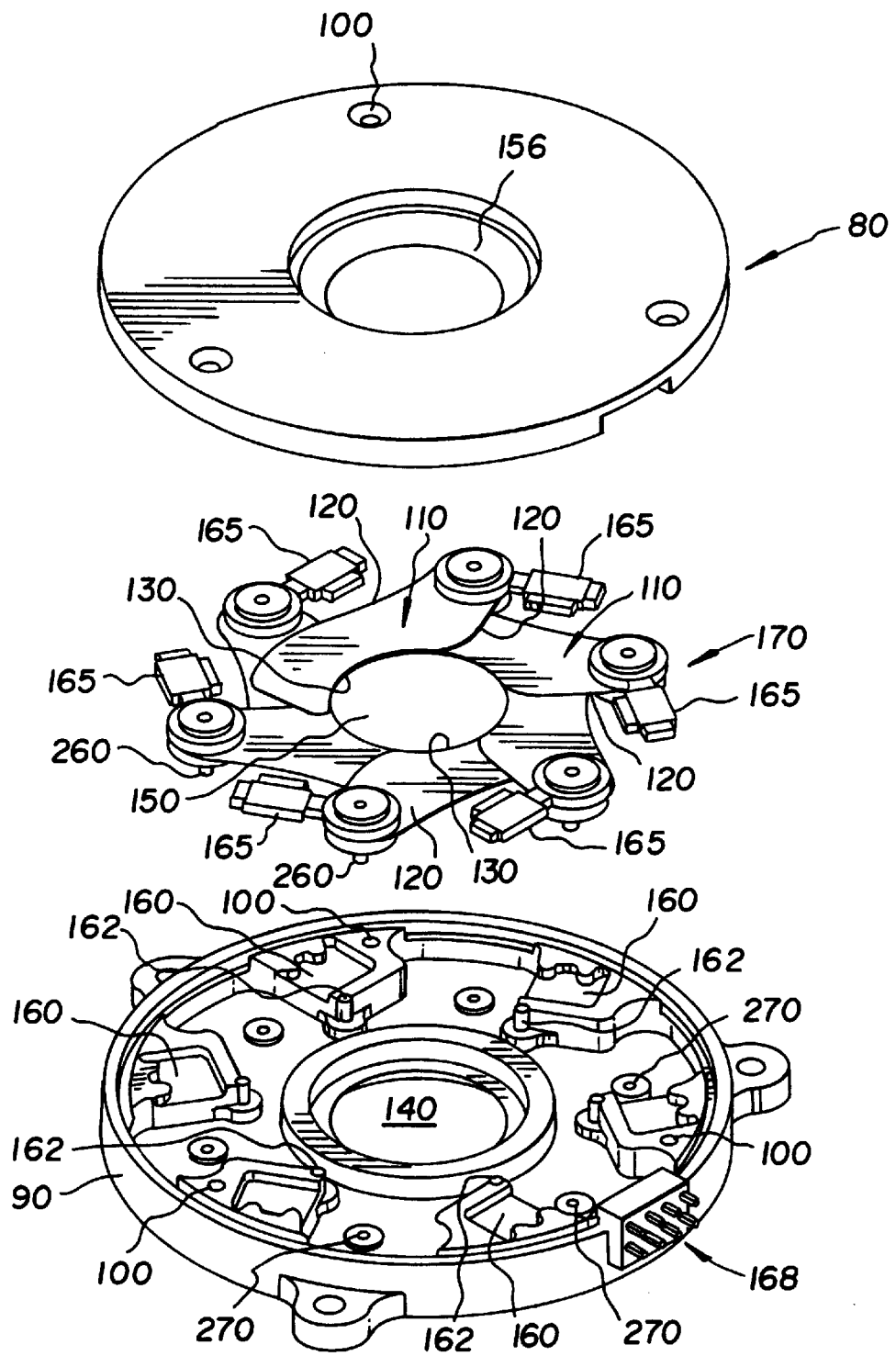
FIG. 3 is a perspective view of the iris diaphragm of the present invention illustrating its assembly.

Referring to FIGS. 2 and 3, there is illustrated in detail the iris diaphragm 70 having a top cover 80. The iris diaphragm 70 includes a bottom cover 90 which is attached to the top cover 80 for forming a housing for the iris diaphragm 70. A plurality of holes 100 are placed in both covers 80 and 90, and are in registry with each other for receiving screws (not shown) for attaching the top and bottom covers 80 and 90 together. A plurality of moveable blades 110 each having a stem 120 and a generally curved shape end portion 130 are placed adjacent a center opening 140 in the bottom cover 90. The blades 110 cooperate together to form a variable aperture 150 of the iris diaphragm 70. A center hole 155 is provided in the top cover 80 which, in combination with the aperture 150 and a bottom center hole 140 in the bottom cover 90, permits light to pass through the iris diaphragm 70.

As best illustrated in FIG. 3, six actuator pockets 160 are disposed around the peripheral portion of the bottom cover 90 for each respectively receiving actuator motors 165 therein that function to ultimately drive the blades 110 to their various positions, as will be described in detail below. A plurality of stops 162 are positioned adjacent each pocket 160, and when contacted by their respective blade, limit the outwardly extending motion of the blades 110. An electrical pin assembly 168 is disposed on the bottom cover 90 and is electrically connected to each motor 165 via electrical lead wires (not shown) for receiving signals from a programmable controller (not shown) that is attached to the pin assembly 168 via a cable (not shown). The programmable controller is preprogrammed to direct the operation of the motors 165, as is well known in the art. The blades 110 are structurally suspended by a blade assembly 170 (also described in detail below), and are movable so that a diameter (d) of the aperture 150 is varied as the blades 110 are moved.

Figure 4:
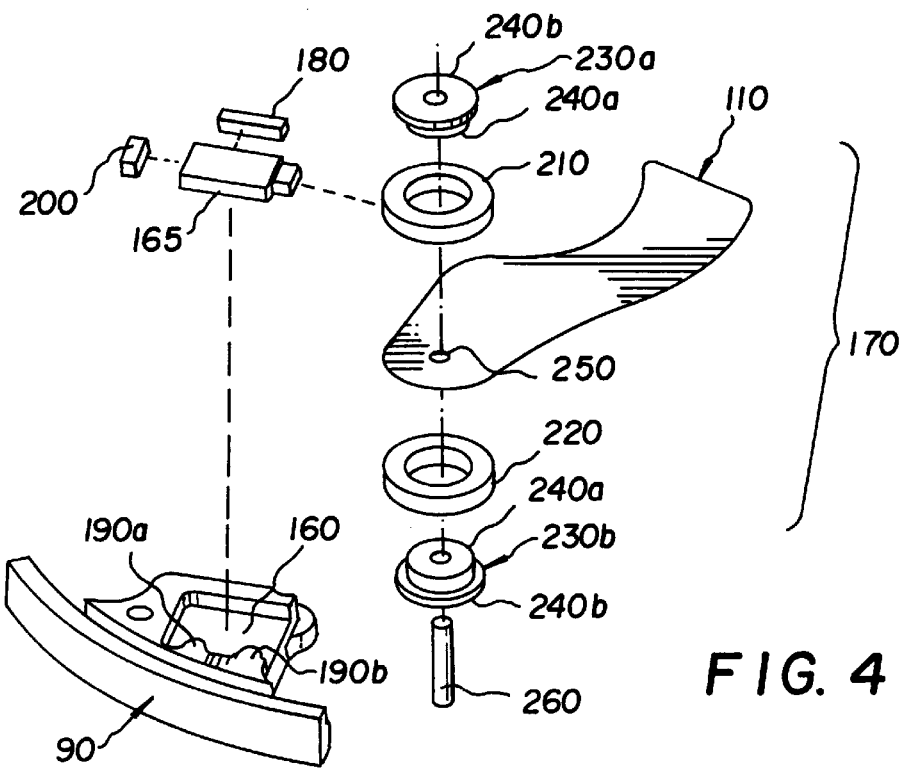
FIG. 4 is an exploded view of a yoke assembly of the present invention.

Referring to FIG. 4, there is illustrated one of the ceramic motors 165 as it is structurally suspended in its respective actuator pocket 160 by the blade assembly 170. It should be understood that, although only one motor 165 assembled in the bottom cover 90 is shown, each of the ceramic motors 165 are assembled in the same manner, and only one is shown for purposes of succinctness. In this regard, an elastomer pad 180 is positioned in the pocket 160 for urging the actuator against two support nubs 190a and 190b for maintaining the ceramic motor 165 snugly within the pocket 160, and an elastomer pad 200 is also positioned in the pocket 160 for urging the actuator toward a drive support ring 210.

The blade assembly 170 includes a drive ring 210 and a drive support ring 220 each having a hollowed-out center portion with the rings 210 and 220 rigidly attached to opposite sides of the blade 110. Two ball bearings 230a and 230b both include first and second tiers 240a and 240b with a hole through the center portions of each tier 240a and 240b, and the first tiers 240a are respectively inserted into each support ring 210 and 220 while the second tiers 240b respectively abut against an outer surface of the rings 210 and 220 for permitting the rings 210 and 220 to rotate about their respective ball bearing. A hole 250 is disposed in the blade 110 and is in registry with the holes in the rings 210 and 220 and ball bearings 230 through which aligned holes and pin 260 is inserted for maintaining each ball bearing 230, each support ring 210 and 220 and the blade 110 about a common axis, the pin 260. The pin 260 is inserted into a hole 270 (see FIG. 3) in the bottom cover 90 for supporting it therein.

Figure 5:
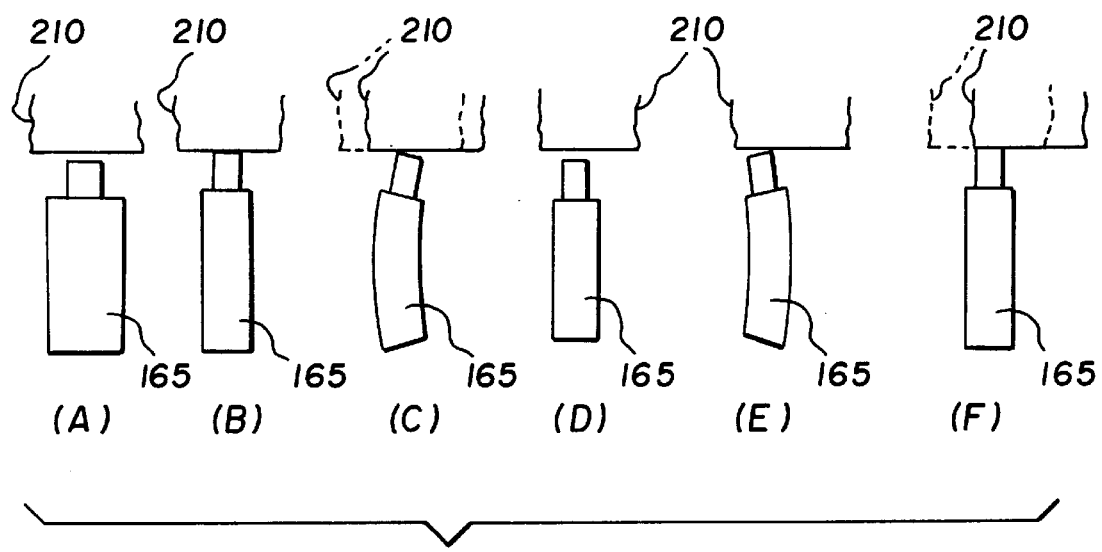
FIG. 5 is an illustration of the operation of ceramic motors of the present invention.

The operation of the iris diaphragm 70 is as follows. However, before discussing the operation further, it facilitates understanding to briefly describe the operation of a ceramic motor. Referring to FIG. 5, an illustration of ceramic motors is shown. The motors 165 are resiliently flexible so that they can be bent into arcuate shapes. In the illustration, position (A) illustrates the motor in its de-energized state which causes it to have a linear shape. In positions (B) and (C), the motor 165 is energized to a first energized state which causes the motor to first extend outwardly, position (B), and then bend leftwardly, position (C) for pushing the support ring 210 in a rightwardly direction. Position (D) again illustrates the motor 165 in de-energized state. To move the support ring 210 in the leftwardly direction, a second energized state, the motor 165 extends outwardly toward the support ring 210 and also flexes rightwardly, position (E), for pushing the support ring 210 leftwardly, position (F). For further disclosure of ceramic motors, reference U.S. Pat. Nos. 5,453,653 and 5,616,980.

Referring to FIGS. 2 and 4, to operate the opening and closing of the aperture formed by the blades 110, the controller signals the ceramic motors 165 to start their energized, first-state operation. The ceramic motors 165 then push the blades 110 to the fully open position—resting against the stop 162. In regard to the pushing operation, each motor 165 pushes against their respective support ring 210 which causes it to rotate around the ball bearing 230a, which consequently causes the blade 110 to rotate and the driven support ring 220 to rotate about the ball bearing 230b. A look-up table stored in memory (not shown) is electrically connected to the controller, and includes an index containing the number of steps, or pushing operations, the ceramic motors 165 should be processed through for obtaining a diameter size.

The ceramic motors 165 are then energized to their second state for closing the aperture to the desired diameter (d). Similarily, the look-up table contains the number of steps necesary to accomplish the desired diameter during the closing process.

The invention has been described with reference to a preferred embodiment. However, it will be appreciated that variations and modifications can be effected by a person of ordinary skill in the art without departing from the scope of the invention.

In this regard, while the invention has been disclosed in the preferred embodiment as being implemented by an iris diaphragm, the invention may also be implemented on a shutter.

PARTS LIST:

10 photographic printer
20 light source
30 film
40 paper
50 lens assembly
60 zoom lens elements
70 iris diaphragm
80 top cover
90 bottom cover
100 holes
110 moveable blades
120 stem
130 end portion
140 center opening
150 aperture
155 center hole
160 pocket 162 stops
165 motors
168 pin assembly
170 assembly
180 pad
186 pin assembly
190*a* support nubs
190*b* support nubs
200 pad
210 support ring
220 support ring
230*a* bearings
230*b* bearings
240*a* tiers
240*b* tiers
250 hole
260 pin
270 hole

We claim:

1. An iris diaphragm for selectively varying a diameter of an aperture, the iris diaphragm comprising:
   (a) a plurality of movable blades which are adaptable for forming the aperture;
   (b) a plurality of ceramic motors respectively attached to each one of said blades for causing said blades to vary the aperture formed therefrom; and
   (c) a plurality of first support rings respectively attached to a first surface of each one of said blades, and said first support rings, when engaged by said motors, causes said blades to move which, in turn, causes the aperture to vary; wherein said ceramic motor is resiliently flexible so that, when said ceramic motor engages said first support ring for movement, said ceramic motor bends to an arcuate shape and when said ceramic motor is not urging said first support ring for movement said ceramic motor is substantially linear.

2. The iris diaphragm as in claim 1 further comprising a plurality of first bearings respectively received by each said first support ring which said bearings permit said first support rings to rotate when engaged by said motors.

3. The iris diaphragm as in claim 2 further comprising a plurality of second support rings respectively attached to a second surface of each one of said blades for assisting in rotation of said blades.

4. The iris diaphragm as in claim 3 further comprising a plurality of second bearings respectively received by each said second support ring which said bearings permit said second support rings to rotate when engaged by said motors.

5. The iris diaphragm as in claim 1, wherein said first support rings are circular shaped with a hollowed-out center portion.

6. The iris diaphragm as in claim 3, wherein said second support rings are circular shaped with a hollowed-out center portion.

7. The iris diaphragm as in claim 1 further comprising a programmable controller electrically connected to said motors for directing operation of said motors.

8. The iris diaphragm as in claim 1 further comprising a pin about which said support rings pivot.

9. A photographic printer for selectively varying a diameter of an aperture, the printer comprising:
   (a) at least two movable blades which are adaptable for forming the aperture of said photographic printer;
   (b) a plurality of ceramic motors respectively attached to each one of said blades for causing said blades to vary the aperture formed therefrom; and
   (c) a plurality of first support rings respectively attached to a first surface of each one of said blades, and said first support rings, when engaged by said motors, causes said blades to move which, in turn, causes the aperture to vary; wherein said ceramic motor is resiliently flexible so that, when said ceramic motor engages said first support ring for movement, said ceramic motor bends to arcuate shape and when said ceramic motor is not urging said first support ring for movement said ceramic motor is substantially linear.

10. The photographic printer as in claim 9 further comprising a plurality of first bearings respectively received by each said first support ring which said bearings permit said first support rings to rotate when engaged by said motors.

11. The photographic printer as in claim 10 further comprising a plurality of second support rings respectively attached to a second surface of each one of said blades for assisting in rotation of said blades.

12. The photographic printer as in claim 11 further comprising a plurality of second bearing respectively received by each said second support ring which said bearings permit said second support rings to rotate when engaged by said motor.

13. The photographic printer as in claim 9, wherein said first support rings are circular shaped with a hollowed-out center portion.

14. The photographic printer as in claim 11, wherein said second support rings are circular shaped with a hollowed-out center portion.

15. The photographic printer as in claim 9 further comprising a programmable controller electrically connected to said motors for directing operation of said motors.

* * * * *